(12) United States Patent
Coltman et al.

(10) Patent No.: US 7,333,768 B1
(45) Date of Patent: Feb. 19, 2008

(54) APPARATUS AND METHOD FOR SOUND STORAGE AND RETRIEVAL

(76) Inventors: Judith Neely Coltman, 18 Milton Rd., Reading, MA (US) 01867; John Gaewsky, 41 Beaver Rd., Reading, MA (US) 01867

( * ) Notice: Subject to any disclaimer, the term of this patent is extended or adjusted under 35 U.S.C. 154(b) by 914 days.

(21) Appl. No.: 10/160,739

(22) Filed: May 31, 2002

Related U.S. Application Data

(60) Provisional application No. 60/295,291, filed on Jun. 1, 2001.

(51) Int. Cl.
*G09B 5/04* (2006.01)
*G09B 5/00* (2006.01)
*G09B 5/06* (2006.01)
*G09B 5/02* (2006.01)

(52) U.S. Cl. ............ 434/317; 434/319; 235/454
(58) Field of Classification Search ............ 434/317, 434/319; 235/440, 462.01, 454, 462.08, 235/462.13, 462.17, 462.42; 283/85
See application file for complete search history.

(56) References Cited

U.S. PATENT DOCUMENTS

| | | | |
|---|---|---|---|
| 3,699,311 A | 10/1972 | Dunbar | |
| 4,809,246 A * | 2/1989 | Jeng | 434/317 |
| 4,884,974 A | 12/1989 | DeSmet | |
| 4,990,092 A | 2/1991 | Cummings | |
| 5,063,698 A | 11/1991 | Johnson et al. | |
| 5,277,452 A | 1/1994 | Skidmore | |
| 5,520,544 A * | 5/1996 | Manico et al. | 434/317 |
| 5,531,600 A | 7/1996 | Baer et al. | |
| 5,577,918 A | 11/1996 | Crowell | |
| 5,631,883 A | 5/1997 | Li | |
| 5,878,292 A | 3/1999 | Bell et al. | |
| 5,899,700 A * | 5/1999 | Williams et al. | 434/308 |
| 5,903,869 A | 5/1999 | Jacobson et al. | |
| 5,954,514 A * | 9/1999 | Haas et al. | 434/317 |
| 5,954,515 A * | 9/1999 | Iggulden | 434/317 |
| 6,041,215 A * | 3/2000 | Maddrell et al. | 434/317 |
| 6,064,855 A * | 5/2000 | Ho | 434/317 |
| 6,089,943 A * | 7/2000 | Lo | 446/175 |
| 6,167,233 A | 12/2000 | Gresser, Jr. et al. | |
| 6,327,459 B2 * | 12/2001 | Redford et al. | 434/307 R |
| 6,330,427 B1 * | 12/2001 | Tabachnik | 434/317 |
| 6,729,543 B1 * | 5/2004 | Arons et al. | 235/462.13 |

\* cited by examiner

*Primary Examiner*—Robert E. Pezzuto
*Assistant Examiner*—Meagan Thomasson
(74) *Attorney, Agent, or Firm*—Joseph Stecewycz

(57) ABSTRACT

A system for the storage and retrieval of audio files includes an audio storage and retrieval device and a label with an encoded memory storage address. The audio storage and retrieval device includes a memory for storing a plurality of audio files where each stored audio file corresponds to a unique memory storage address, a decoder for reading an encoded memory storage address from the label, and a control module: i) in communication with the decoder for deriving the memory storage address corresponding to the encoded memory storage address and ii) in communication with the memory for retrieving an audio file corresponding to the memory storage address.

9 Claims, 8 Drawing Sheets

APPARATUS AND METHOD FOR SOUND STORAGE AND RETRIEVAL

CROSS-REFERENCE TO RELATED APPLICATION

The present Application is related to Provisional Patent Application entitled "System for Recording and Archiving Multiple Discrete Audio Messages" filed 1 Jun. 2001 and assigned Ser. No. 60/295,291.

BACKGROUND OF THE INVENTION

1. Field of Invention

The present invention relates to audio recording and playback and, in particular, to a system and method for recording, storing, and retrieving audio files using encoded labels.

2. Description of the Background Art

Conventional methods of storing analog audio and digital audio files include magnetic formats such as mylar-based recording tape and magnetic discs and hard drives. Such methods, while practical and widely-used by the average consumer, do not lend themselves to applications in which a brief audio sound clip is desired for quick and easy storage and retrieval. In particular, it is desirable to be able to retrieve a sound clip associated with a photograph, image, or other memorabilia such as found in a scrapbook, school yearbook, or family photo album.

U.S. Pat. No. 6,167,233, "Device for Recording Multiple Discrete Messages for a Book," issued to Gresser, Jr. et al., for example, discloses a book recorder that is attached to or incorporated into a book and that records, archives and plays back multiple discrete messages. The disclosed book recorder includes a text label component which provides a listing of message entries in which the user can write down a brief description of an audio message in the corresponding message entry. This method, however, requires the user to manually cross-reference an audio message to the corresponding photograph, image, or other memorabilia. If the manual entry is made incorrectly, or not made at all, the user may not be able to retrieve the desired sound clip or audio file at a later time.

What is needed is a method and system for recording and playing back sound clips or audio files, where the user can quickly and easily correlate the audio file with an indicium such as a photograph, an image, or other memorabilia found on the page of a book or album.

SUMMARY OF THE INVENTION

The disclosed system and method utilize an audio storage and retrieval device and a label with an encoded memory storage address. The audio storage and retrieval device includes a memory for storing a plurality of audio files where each stored audio file corresponds to a unique memory storage address, a decoder for reading an encoded memory storage address from the label, and a control module. The control module is in communication with the decoder for deriving the memory storage address corresponding to the encoded memory storage address. The control module is also in communication with the memory for retrieving an audio file corresponding to the memory storage address. The audio file is played back by: i) reading a label to obtain an encoded memory storage address, where the label includes at least one of an optically-reflective region, an optically non-reflective region, and a capacitive region, ii) decoding the encoded memory storage address to obtain a memory storage address; and iii) retrieving an audio file from a memory, the audio file located at the memory storage address. The audio file is recorded by: i) reading a label to obtain an encoded memory storage address, where the label includes at least one of an optically-reflective region, an optically non-reflective region, and a capacitive region, ii) decoding the encoded memory storage address to obtain a memory storage address; iii) recording a sound clip as the audio file; and iv) storing the audio file in the memory at the memory storage address.

DETAILED DESCRIPTION OF THE INVENTION

Figure 1:
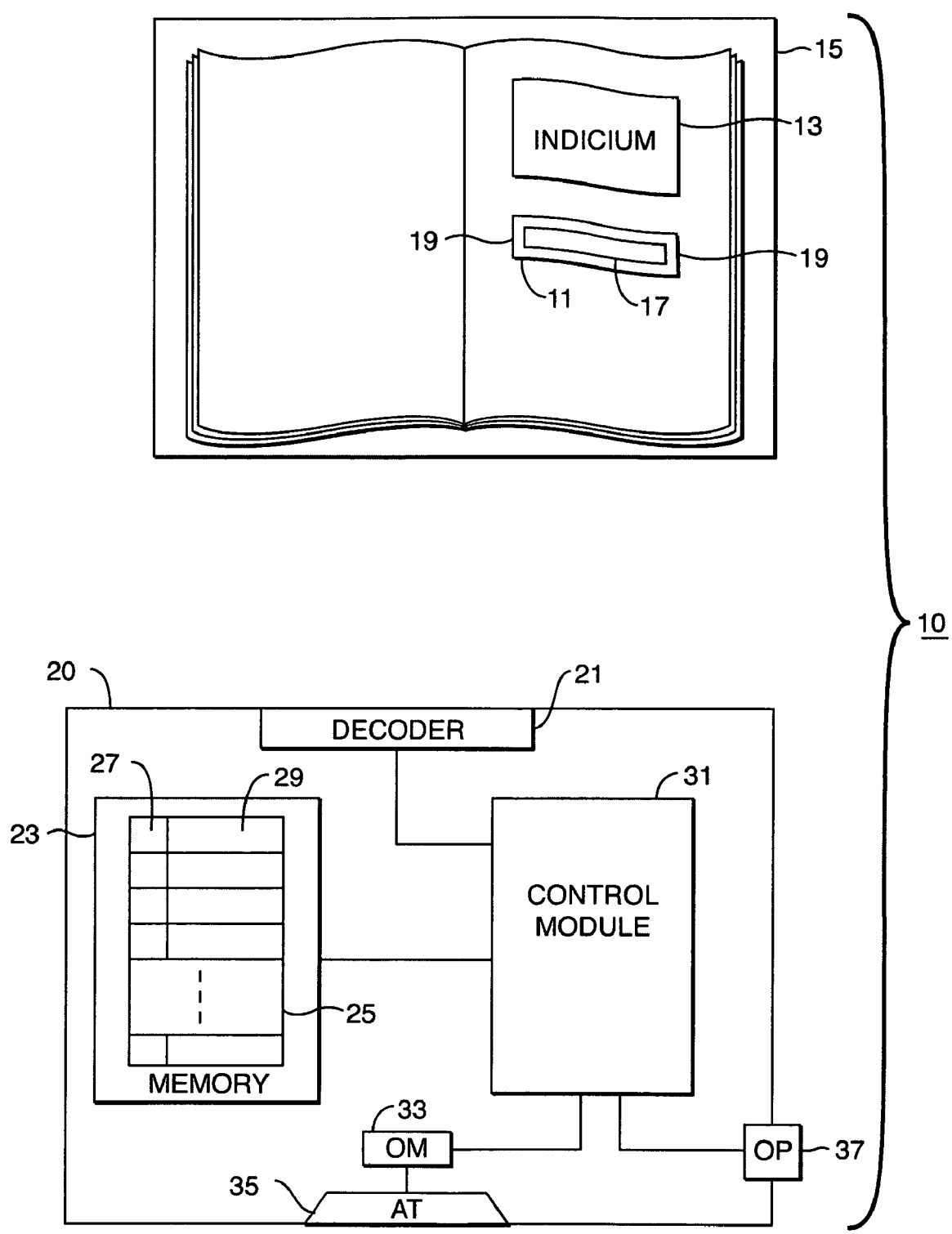
FIG. 1 is a functional block diagram of an audio storage and retrieval system.

There is shown in FIG. 1 a simplified functional block diagram of an audio storage and retrieval system 10 including a label 11 and an audio storage and retrieval device 20. In a typical application, the label 11 is physically emplaced proximate an indicium 13. In way of example, the indicium 13 may be a student photograph in a school yearbook 15 where the label 11 is in the form of a sticker attached to the yearbook page by the user. Among other alternative applications, the indicium 13 may be an image in a scrapbook, an advertisement in a periodical, an illustration or question in an interactive textbook, a diagram in an instruction manual, or any other such documentation which can be enhanced by or supplemented with a related audio file.

The label 11 includes an encoded memory storage address 17 used for locating or identifying one or more audio files associated with the indicium 13. For example, the audio file associated with a student photograph may be a greeting recorded for classmates by the student, the audio file associated with an image in a scrapbook may be a song recorded by a child, and the audio file associated with the question in the interactive textbook may be the verbal response recorded by a student. Similarly, the audio file associated with an advertisement may be a sound clip of a personality endorsing the advertised product, the audio file associated with an illustration of an animal in a textbook may be a recording of a sound made by the animal, and the audio file associated with an automotive repair manual diagram may provide the sound of a problematic engine situation for a mechanic.

Figure 5:
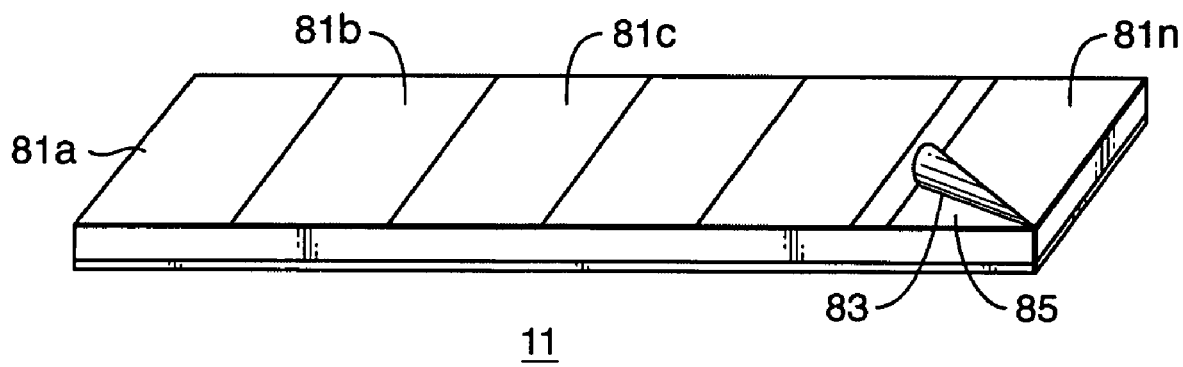
FIG. 5 is a diagrammatical illustration of a coded label used in the audio storage and retrieval system of FIG. 1.

A user of the audio storage and retrieval system 10 reads the encoded memory storage address 17 from the label 11 by using the audio storage and retrieval device 20, as described in greater detail below. The label 11 may be a conventional rectangular shape (as shown in FIG. 5) or may include slanted sides 19, as shown in FIG. 1, to form a trapezoidal shape and provide for alignment while being read. The label 11 preferably includes an adhesive or other attachment means on the reverse surface for allowing a user to attach the label 11 to a page in a book, a scrapbook, or other planar surface. This feature allows the user to associate a sound clip or audio file with the indicium, photograph, image, or other memorabilia on the scrapbook or yearbook page. More importantly, use of the label 11 allows the user to identify any such indicium, photograph, image, or other memorabilia as having an audio file available for retrieval and playback via the audio storage and retrieval device 20.

The audio storage and retrieval device 20 comprises a decoder 21, a control module 31, and a memory 23. The memory 23 may be a solid state memory component, for example, fixed within the audio storage and retrieval device 20, or can be a removable solid state or magnetic memory component so as to allow for insertion of other memory components and provide the user with a greater amount of memory capacity. The decoder 21 is preferably configured to physically interface with the label 11 so as to enable the decoder 21 to read and decode the encoded memory storage address 17.

The memory 23 is used to store a plurality of audio files 25, where each stored audio file is identified by a unique memory storage address. In the example provided, the memory 23 includes an audio file 29 associated with the indicium 13. The audio file 29 is stored in a memory location identified by a memory storage address 27. The memory storage address 27 also resides in the label 11 as the encoded memory storage address 17. Accordingly, when the decoder 21 interfaces with the label 11, the encoded memory storage address 17 can be read by the decoder 21 and provided to the control module 31. As can be appreciated by one skilled in the relevant art, the encoded memory storage address 17 was previously obtained by encoding the memory storage address 27.

The control module 31 derives the memory storage address 27 from the encoded memory storage address 17 to locate and retrieve the audio file 29. Upon retrieval, the control module 31 can send the audio file 29 to an output module 33 where the audio file 29 is converted for playback to the user via an audio transducer 35, such as a loudspeaker. Alternatively, the user can elect to export the audio file 29 in file format via an output port 37.

The control module 31 may be configured to accommodate a variety of solid state memory devices used for the memory 23. In a preferred embodiment, the control module 31 may sense the capacity of the memory 23. Alternatively, the control module 31 may be manually configured for a particular memory component by means of a jumper wire or other such hardware change. By thus providing for various types of memory components, the audio storage and retrieval device 20 can be configured to accommodate audio files 29 of various sizes.

Figure 2:
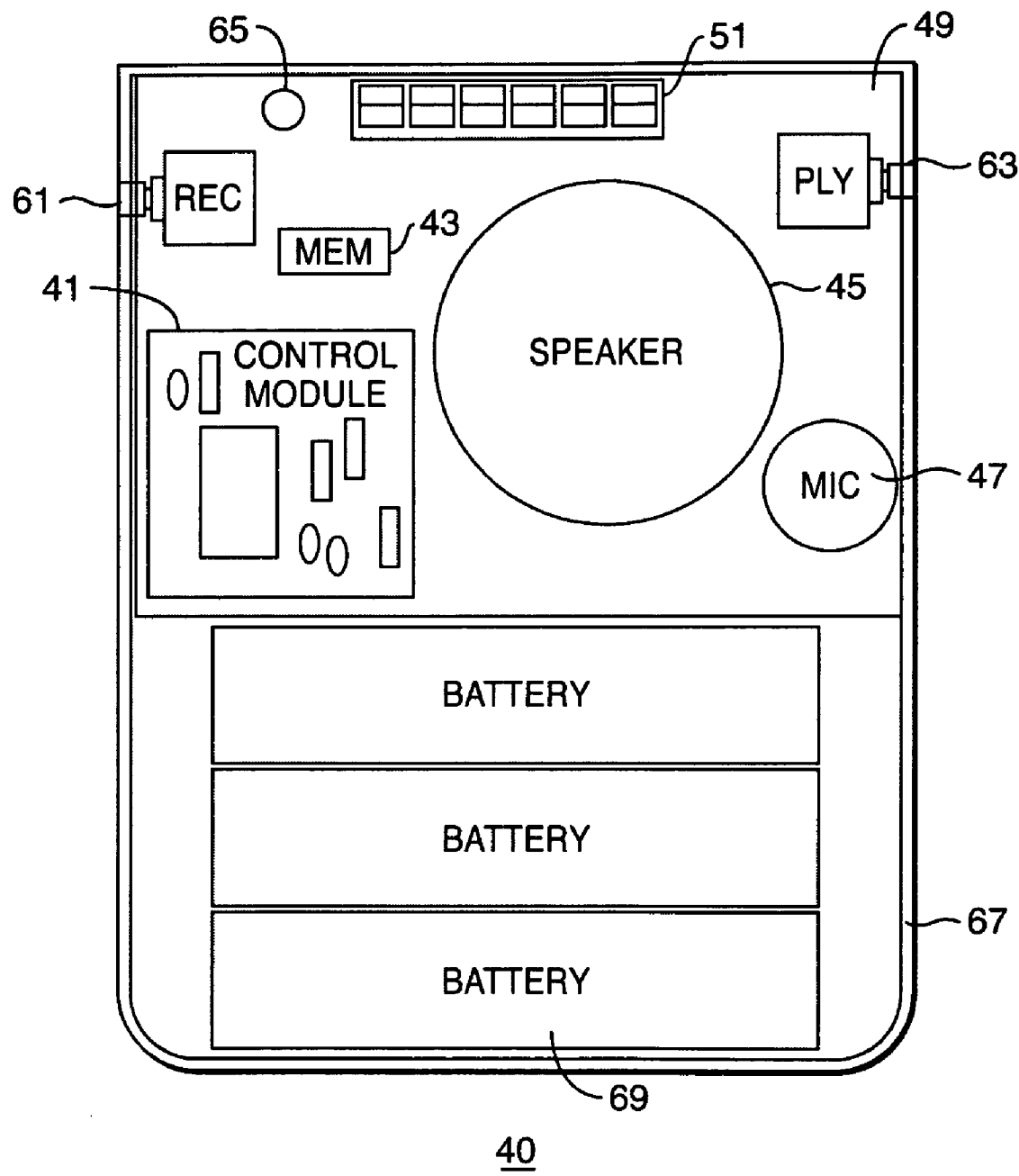
FIG. 2 is a diagrammatical representation of a preferred embodiment of an audio storage and retrieval device used in the audio storage and retrieval system of FIG. 1.

There is shown in FIG. 2 a diagrammatical representation of a preferred embodiment of an audio storage and retrieval device 40. The audio storage and retrieval device 40 comprises a control module 41, a memory 43, a speaker 45, and an optical decoder 51. The audio storage and retrieval device 40 functions to both record and to playback audio files, as described in greater detail below. Accordingly, the audio storage and retrieval device 40 further comprises a microphone 47, a record button 61, and a playback button 63. There is also provided an optical indicator 65, such as a light-emitting diode (LED), to indicate, for example, that the audio storage and retrieval device 40 is operating in a recording mode or that a particular memory storage address can not be written to.

The electrical components are preferably mounted on a printed-circuit board 49. The printed-circuit board 49 is preferably retained in an impact-resistant housing 67, such as can be formed from injection-molded plastic, which may include space for a power source 69, such as batteries. In a preferred embodiment, the memory 43 comprises a plurality of addressable cells, such as found in the ChipCorder® devices available from ISD/Winbond of San Jose, Calif. In an alternative embodiment, the memory 43 comprises a removable component, such as a solid-state memory module, which is then inserted into a suitable port (not shown) in the audio storage and retrieval device 40, as is well-known in the relevant art.

Figure 3:
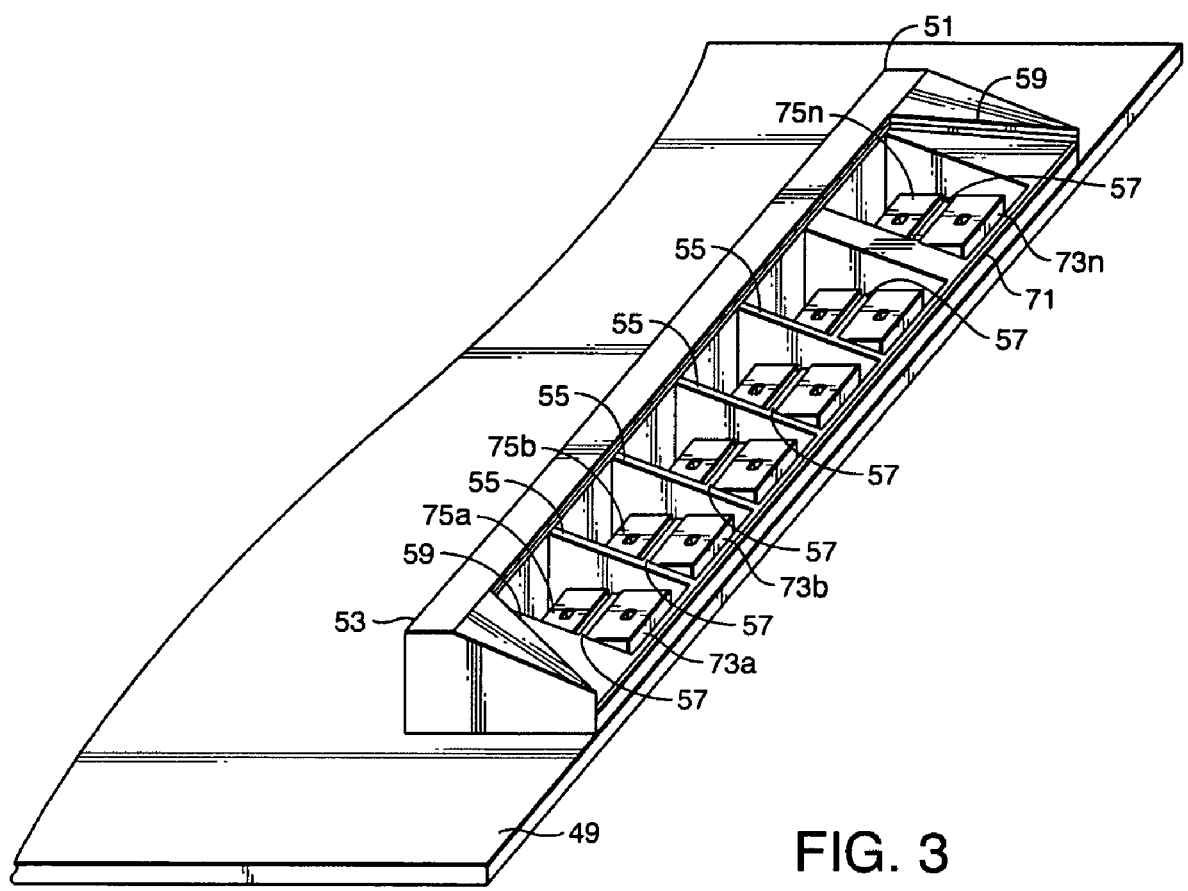
FIG. 3 is a diagrammatical illustration of an optical decoder used in the audio storage and retrieval device of FIG. 2.
Figure 4:
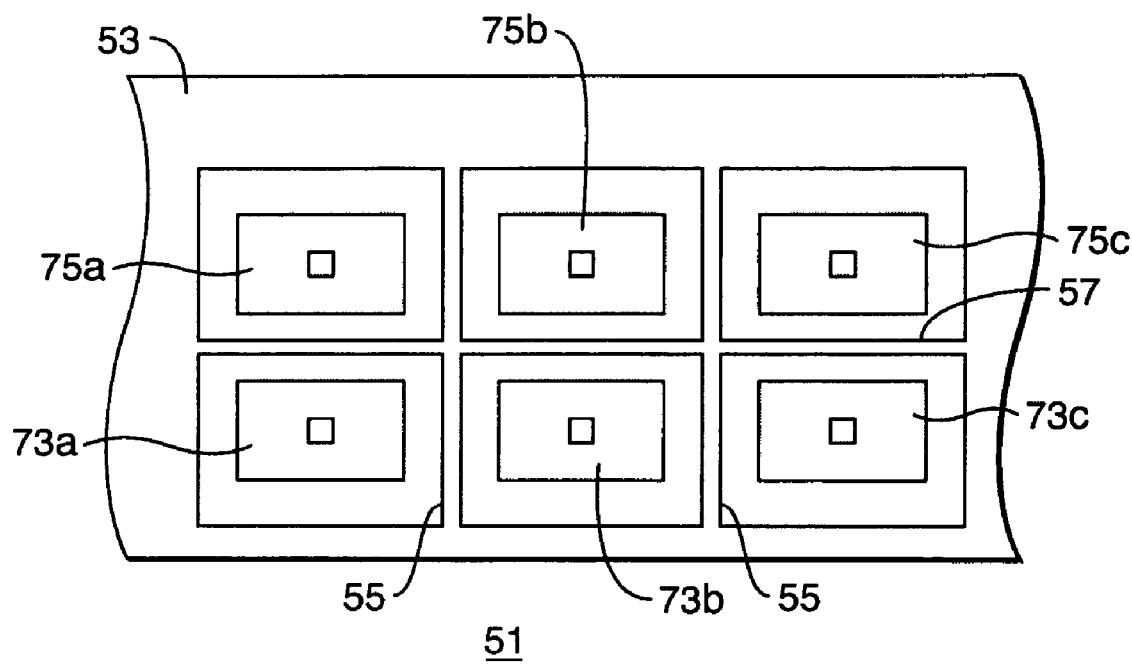
FIG. 4 is a detail view of some of the plurality of optical sources and sensors in the optical decoder of FIG. 3.

The optical decoder 51, shown in greater detail in FIG. 3, comprises an optical detector housing 53 mounted to the printed circuit board 49, and an optically-transparent window 71 attached to the optical detector housing 53. The optical decoder 51 includes a plurality of optical sources 73*a*, 73*b*, . . . , 73*n* and a plurality of optical detectors 75*a*, 75*b*, . . . , 75*n* forming an array, as also shown in FIG. 4. The optical sources 73*a*, 73*b*, . . . , 73*n* may comprise surface-mount LEDs or infrared emitting diodes (IREDs), and the optical detectors 75*a*, 75*b*, . . . , 75*n* may comprise surface-mount photodetectors on the printed circuit board 49. As described in greater detail below, the optical decoder 51 functions by: i) illuminating the label 11 by means of the plurality of optical sources 73*a*, 73*b*, . . . , 73*n*, and ii) reading corresponding radiation reflected from the label 11 by means of the plurality of optical detectors 75*a*, 75*b*, . . . , 75*n*.

Accordingly, the optical detector housing 53 includes a lateral optical baffle or barrier 55 between each source/detector pair, and a transverse optical barrier 57 between each optical source 73*a*, 73*b*, . . . , 73*n* and the corresponding optical detector 75*a*, 75*b*, . . . , 75*n* to prevent 'optical cross-talk.' The lateral optical barrier 55 functions to minimize the optical radiation from the optical source 73*a*, for example, from reaching the adjacent optical detector 75*b*. The transverse optical barrier 57 functions to allow the optical detector 75*b*, for example, to receive reflected optical radiation from the corresponding optical source 73*b* while preventing the optical detector 75*b* from receiving direct optical radiation from the optical source 73*b*.

The optically-transparent window 71 may be recessed in the optical detector housing 53 to accommodate the thickness of the label 11 while allowing the optical detector housing 53 to be placed flush against the surface to which the label 11 is attached. The flush positioning serves to prevent stray ambient light from impinging on the optical detector 75*a*, 75*b*, . . . , 75*n*. The optical detector housing 53 may further include slanted edges 59 to provide for a trapezoidally-shaped recess adjacent the optically-transparent window 71. When so configured, the trapezoidally-shaped recess is guided onto the label 11 by the slanted sides 19, shown in FIG. 1, to provide for a correct alignment of the optical decoder 51 with the label 11. The slanted edges 59 thus prevent the label 11 from being inadvertently emplaced or read upside down and further serve to provide a tactile alignment feature to the user.

If IREDs are used as sources of optical radiation, IR-band pass filtering techniques can be used so as to block stray visible light from impinging on the optical detectors 75a, 75b, . . . , 75n while allowing IR radiation reflected from the label 11 to pass to the optical detectors 75a, 75b, . . . , 75n. For example, the IR optical detector may include an IR band-pass lens or other IR band-pass packaging to filter the detected radiation. Alternatively, the optically-transparent window 71 may serve as the IR band-pass filter. As understood in the relevant art, stray light, such as that originating with ambient fluorescent illumination, lies primarily in the visible spectrum with little energy at IR wavelengths.

Because yearbooks and scrapbooks are likely to be viewed under fluorescent illumination, for example, a user would preferably use labels 11 fabricated with IR-reflective regions and IR non-reflective regions. Under such viewing conditions, the labels 11 would be more easily distinguished from the background, printing, and paper comprising the pages of yearbooks or scrapbooks than if visible light were used in the optical decoder 51. By using IREDs as a source of radiation in the optical decoder 51, the audio storage and retrieval device 40 can thereby benefit from the advantages provided by labels 11 having IR-reflective regions and IR non-reflective regions.

The label 11, shown in greater detail in rectangular format in FIG. 5, configures the encoded memory storage address 17 as a linear array of regions 81a, 81b, . . . , 81n in precise correspondence with the linear array of optical sources 73a, 73b, . . . , 73n and optical detectors 75a, 75b, . . . , 75n. Accordingly, when the optical decoder 51 is placed in position against the label 11, the region 81a is adjacent the optical source 73a and the optical detector 75a, the region 81b is adjacent the optical source 73b and the optical detector 75b, and so on such that the region 81n is adjacent the optical source 73n and the optical detector 75n.

In the example provided, the region 81a is substantially non-reflective to the radiation emitted by the optical source 73a (i.e., the region 81a comprises a dark color). Accordingly, when the optical source 73a illuminates the region 81a, little if any optical radiation is detected at the corresponding optical detector 75a. In comparison, the region 81b is substantially reflective to the radiation emitted by the optical source 73a (i.e., the region 81b comprises a light color), and when the optical source 73b illuminates the region 81b, there is produced a detectable level of optical radiation at the corresponding optical detector 75b. Thus, each of the regions 81a, 81b, . . . , 81n is either substantially reflective or substantially non-reflective to optical radiation, that is, typically appears essentially either black or white.

The linear array of regions 81a, 81b, . . . , 81n thus forms a unique geometric black and white pattern (i.e., unique for each encoded memory storage address) which comprises an encoded representation of the memory storage address 27, for example, by using a substantially optically non-reflective region (i.e., resulting in reflected radiation below a detectable threshold) to represent a binary value of '0' to the control module 41 and by using a substantially optically reflective region (i.e., resulting in reflected radiation above the detectable threshold) to represent a binary value of '1.'

As can be appreciated by one skilled in the relevant art, the light/dark pattern of the linear array of regions 81a, 81b, . . . , 81n on the label 11 will be unique for each memory storage address 29 encoded for the corresponding indicium 13. It should also be understood that the control module 31 can be alternatively configured to read a substantially optically reflective region as representing a binary value of '0' and to read a substantially optically non-reflective region as representing a binary value of '1.' It can be seen that the maximum number of different memory storage addresses that can be read by the audio storage and retrieval device 40 is a function of the number of source/detector pairs provided in the decoder 51. For example, five optical detectors can provide for up to thirty-two (i.e., $2^5$) unique memory storage addresses.

During operation of the audio storage and retrieval device 40, the optical decoder 51 is placed against the label 11 in proper alignment. The optical sources 73a, 73b, . . . , 73n are powered so as to emit optical radiation. Each of the corresponding optical detector 75a, 75b, . . . , 75n detects the radiation reflected from corresponding regions 81a, 81b, . . . , 81n when the corresponding optical source 73a, 73b, . . . , 73n is powered. The reflected radiation readings can be processed by the control module 31 from all the optical detectors 75a, 75b, . . . , 75n at the same time, or the radiation readings can be processed from a single optical detector at a time. In the preferred embodiment, if the optical radiation reflected from one of the regions 81a, 81b, . . . , 81n is at or above a predetermined threshold, a binary '1' is indicated, and if the reflected radiation is below the predetermined threshold, a binary '0' is indicated. These signals are provided to the control module 31 for derivation of the corresponding memory storage addresses.

In an alternative embodiment (not shown), the optical decoder comprises only one or two optical sources instead of the plurality of optical sources disclosed above. A light pipe is emplaced across the regions 81a, 81b, . . . , 81n. The light pipe receives optical radiation from the one or two optical sources and illuminates the regions 81a, 81b, . . . , 81n, where the one or two optical sources may be provided at one or both ends of the optical detector housing 53, for example. The lateral barriers 55 are preferably reconfigured to accommodate the light pipe while still preventing the occurrence of optical cross-talk between light/dark regions.

In yet another alternative embodiment (not shown), the optical decoder comprises only one optical detector instead of the plurality of optical detectors disclosed above. The single optical detector is used with a light pipe extending across the regions 81a, 81b, . . . , 81n to detect optical radiation reflected from any of the regions 81a, 81b, . . . , 81n. In this embodiment, reflected radiation readings are processed by the control module 31 from one of the regions 81a, 81b, . . . , 81n at a time. This can be accomplished, for example, by not powering optical sources 73b, . . . , 73n and powering only the optical source 73a to illuminate the region 81a. The single optical detector reads the resultant reflected illumination reading as an indication of reflected radiation from the region 81a. The process is repeated, powering only optical source 73b to obtain the reflected illumination from the region 81b, and so on, until all the regions 81a, 81b, . . . , 81n have been read for decoding.

In still another alternative embodiment, the region 81n serves as an archive file indicator that includes an optically non-reflective archive tab 83 which can be removed by the user to expose an optically reflective substrate region 85 on the label 11. The tab 83 can be held in place with a non-permanent adhesive, for example, or can be pre-scored to allow for breaking off by the user. In the alternative embodiment, the control module 41 enables the recording mode for the audio storage and retrieval device 40 when the archive tab 83 is in place and, when the archive tab 83 has been removed, disables the recording mode to prevent unintentional recording. Alternatively, a reflective tab can be removed to expose an optically non-reflective substrate region (not shown).

Figure 6:
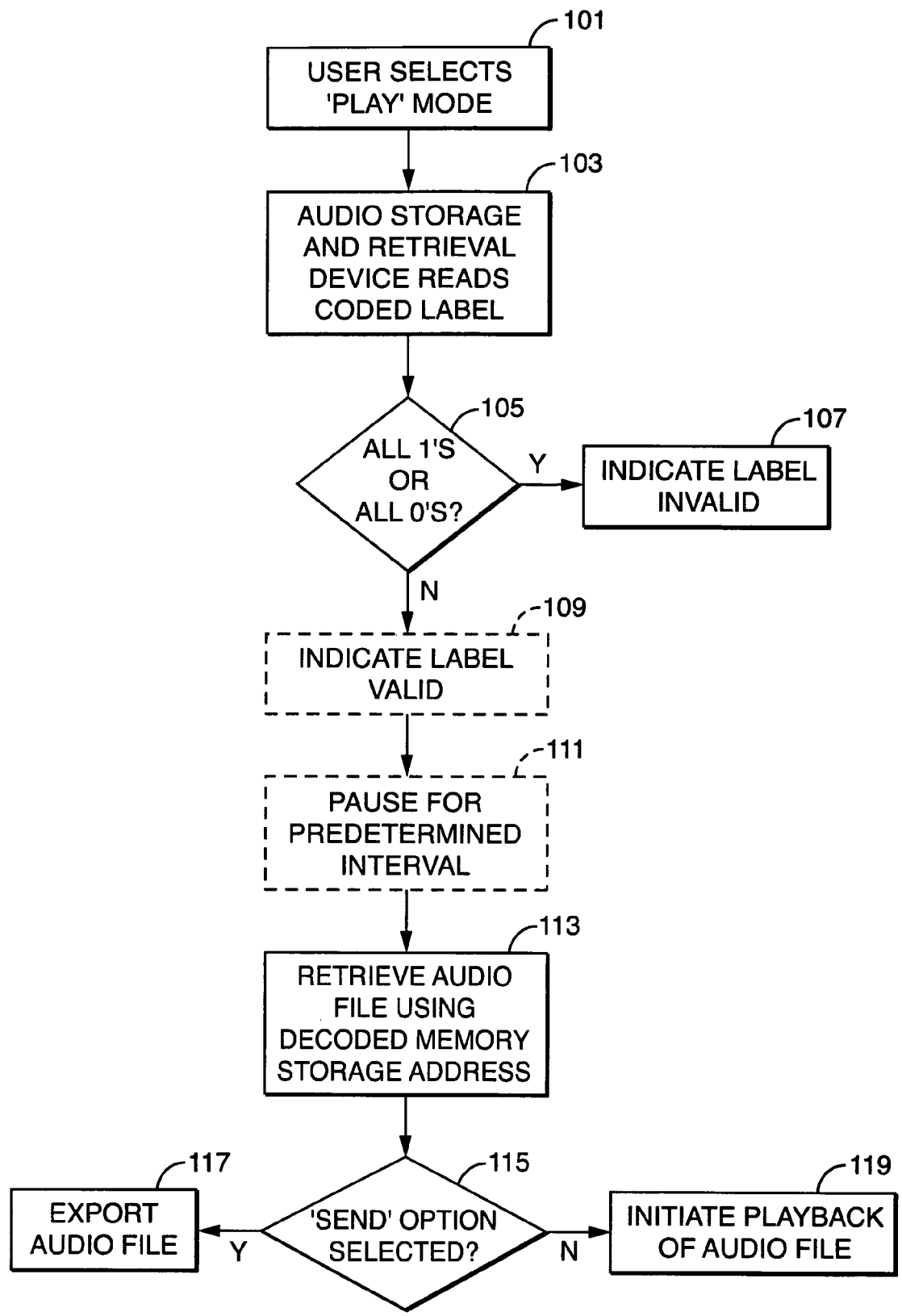
FIG. 6 is a flow diagram illustrating a 'play' mode for the audio storage and retrieval device of FIG. 2.

Playback operation of the audio storage and retrieval device 40 can be described with reference to the flow diagram of FIG. 6. The user selects a 'Play' mode, at step 101 and the audio storage and retrieval device 40 reads the coded label 11, at step 103, using the optical decoder 51. If the optical decoder 51 detects all binary 1's or 0's, at decision block 105, an 'Invalid Label' indication is given, at step 107. The indication may comprise a first audio tone or a pulsing of the optical indicator 65, for example. The 'invalid label' condition results if there is no label presented for reading by the optical decoder 51.

If a valid label is present, at decision block 105, this may be indicated at optional step 109, by a display on the audio storage and retrieval device 40 or by a second audio tone, for example. At this point, the audio storage and retrieval device 40 may pause in operation for a predetermined amount of time (e.g., one second), at optional step 111, to allow the user to take the audio storage and retrieval device 40 away from the label 11 for improved listening during playback. Using the coded memory storage address 17 obtained in step 103, the audio storage and retrieval device 40 derives the memory storage address 27 and retrieves the audio file 29 corresponding to the memory storage address 27, at step 113. If the user selects a 'Send' option, at decision block 115, the audio file 29 is provided to the output port 37, at step 117. Otherwise, the audio file 29 is sent to the audio transducer 35 for playback to the user, at step 119.

Figure 7:
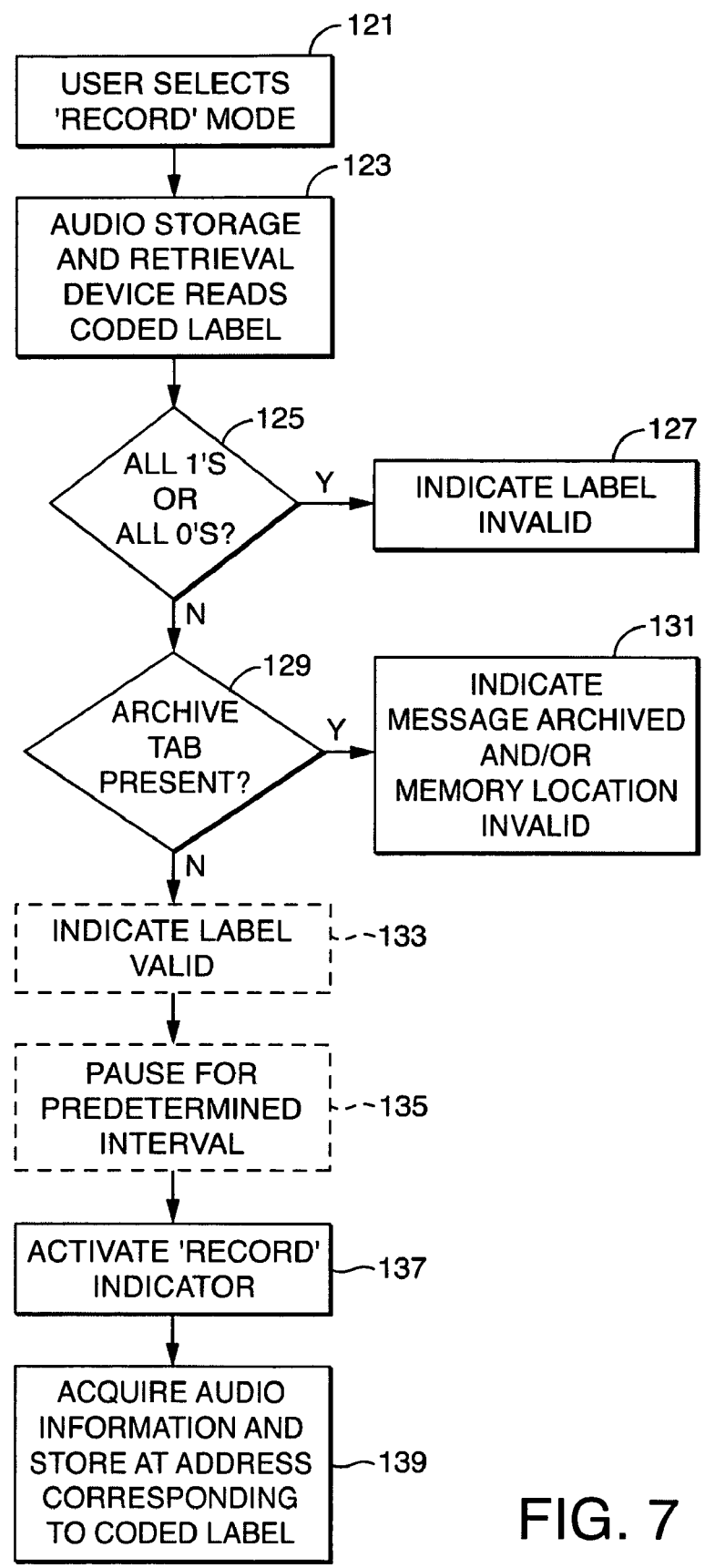
FIG. 7 is a is a flow diagram illustrating a 'record' mode for the audio storage and retrieval device of FIG. 2.

The recording and storage of the audio file 29 can be described with reference to the flow diagram of FIG. 7. The user selects a 'Record' mode, at step 121 and the audio storage and retrieval device 40 reads the coded label 11, at step 123, to determine the encoded memory storage address 17 for deriving the memory storage address 27 to be used for storage of the recorded audio file 29. If the decoder optical decoder 51 detects all binary 1's or 0's, at decision block 125, an 'Invalid Label' indication is given, at step 127. The optical decoder 51 checks the archive tab 83, at decision block 129, and indicates that the memory storage address 27 contains an archived message and recording may not take place, at step 131, if the tab has been set. Otherwise, an indication of a valid memory address may be optionally provided, at step 133.

The audio storage and retrieval device 40 may pause in operation for the predetermined amount of time, at optional step 135, to allow the user to position the microphone 47 toward the sound to be recorded, for example. A 'Record' indicator is activated, such as pulsating the optical indicator 65, at step 137. The audio information is acquired from the user, at step 139, and stored at the memory storage address 27. The duration of the audio information recorded and filed is determined by the amount of time the record button 61 is held down. In addition, there may be provided a predetermined time limit for recording (e.g., fifteen seconds) in order to prevent the size of the audio file 29 from exceeding a predetermined file size. At this point, the user can elect to review the recorded message by initiating the playback procedure described above. If the audio is satisfactory, the archive tab can be removed from the label 11 to prevent subsequent writing over of the audio file 29.

Figure 8:
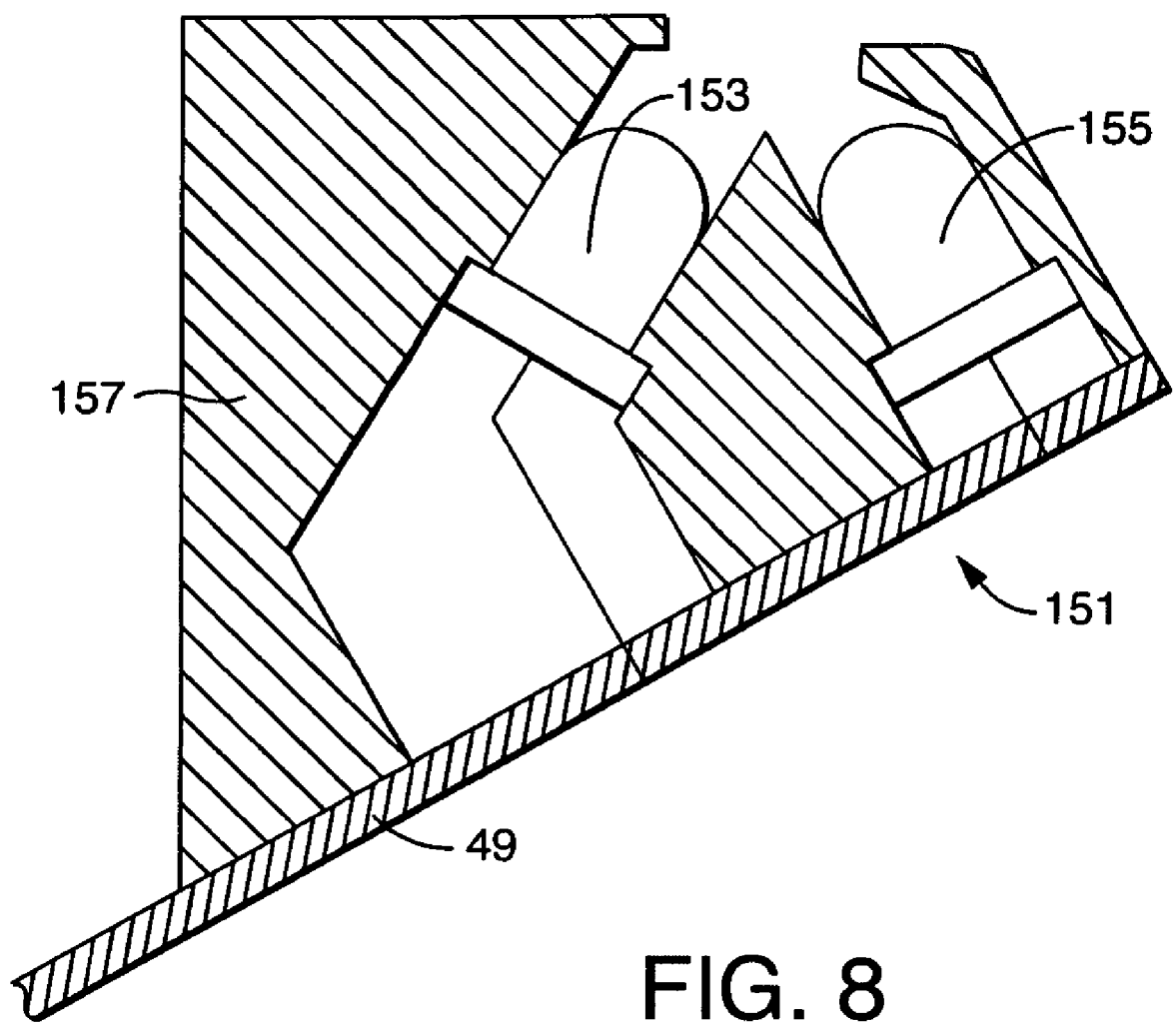
FIG. 8 is a diagrammatical illustration of an alternative embodiment of the optical decoder of FIG. 3.

In an alternative embodiment shown in FIG. 8, an optical decoder 151, here shown in cross-sectional view, comprises a plurality of optical sources 153 and optical detectors 155 mounted to the printed-circuit board 49. The optical sources 153 and optical detectors 155 are mounted in a decoder housing 157 to maintain relative alignment and to provide for reading of the label 11 as described above. The optical source 153 comprises a through-hole LED or IRED, and the optical detector 155 comprises a through-hole photodetector or phototransistor. The use of through-hole components may be advantageous for certain methods of fabrication.

Figure 9:
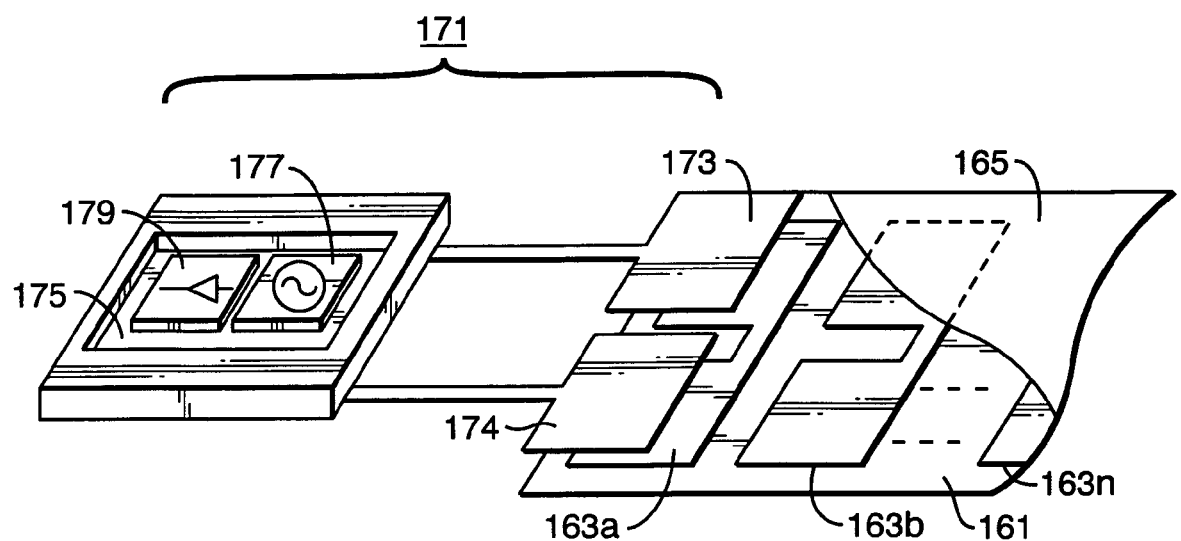
FIG. 9 is a diagrammatical illustration of a capacitive decoder for use in the audio storage and retrieval device of FIG. 1.

In yet another alternative embodiment, shown in FIG. 9, a capacitive coded label 161 comprises a unique pattern of capacitive regions 163$a$, 163$b$, . . . , 163$n$ covered by a thin dielectric layer 165. The capacitive region 163$a$ is read by means of a pair of capacitive sensors 173 and 174 in electrical communication with a sensing module 171. In a preferred embodiment, the pair of capacitive sensors 173 and 174 are housed in a capacitive decoder (not shown for clarity) with a plurality of additional capacitive sensor pairs (not shown). All the capacitive sensor pairs are positioned and spaced relative to one anther such that there is provided one pair of capacitive sensors in the capacitive decoder at the location of each capacitive region 163$a$, 163$b$, . . . , 163$n$ in the coded label 161 when the capacitive decoder is placed against the coded label 161.

Figure 10:
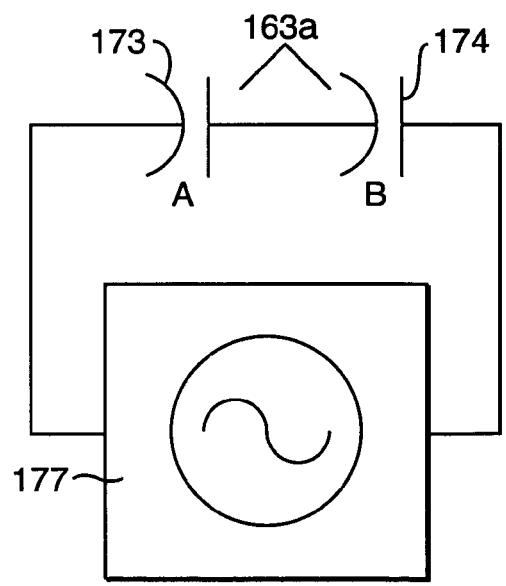
FIG. 10 is a circuit diagram illustrating operation of the capacitive decoder of FIG. 9.

The capacitive regions 163$a$, 163$b$, . . . , 163$n$ can be formed by depositing or screening a conductive substance, such as metalized or conductive ink, in a pattern similar to that shown in the illustration. As can be appreciated by one skilled in the relevant art, the combination of a conductive substance and the dielectric layer 165 functions to form a portion of a capacitor. As 'seen' by the capacitive decoder, the presence of a capacitive region indicates a binary '1' (or '0'), and a binary '0' (or '1') is indicated by the lack of a capacitive region at a particular location in the coded label 161. The sensing module 171 includes a detection circuit 175 comprising an oscillator 177 and a detector 179. Operation of the sensing module 171 can be explained with additional reference to FIG. 10. As the capacitive decoder is brought in to read the coded label 161, the pair of capacitive sensors 173 and 174 are precisely placed adjacent the capacitive region 163$a$. The shapes and sizes of the capacitive sensors 173 and 174 are similar to the shape and size of the capacitive region 163$a$. Accordingly, the capacitive sensors 173 and 174 are separated from the capacitive region 163$a$ by the dielectric layer 165 to form capacitors A and B connected in series with the oscillator 177.

The oscillator 177 applies a signal across the pair of capacitive sensors 173 and 174, wherein the signal is coupled through the capacitors A and B. The coupling of the capacitors A and B with the sensing module 171 enables the oscillation of the oscillator 177. This oscillation is detected by the detector 179. Detection of such oscillation indicates the presence of the capacitive region 163$d$ which, in turn, indicates a binary '1' (or '0'). Lack of oscillation indicates that no capacitive region is present at the particular location on the coded label 161 which, in turn, indicates a binary '0' (or '1').

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. An audio storage and retrieval system comprising:
   a label having an encoded memory storage address, said label including a surface having at least one optically reflective region and at least one optically non-reflective region; and an audio storage and retrieval device including
- a memory for storing a plurality of audio files, each said stored audio file corresponding to a unique memory storage address;
- a decoder, for reading said encoded memory storage address from said label, said decoder including a plurality of optical sources and a plurality of optical detectors, said decoder further including lateral optical barriers disposed between adjacent pairs of said optical sources and said optical detectors so as to prevent optical radiation emitted from a said optical source in one said pair from reaching a said optical sensor in an adjacent said pair; and
- a control module in communication with said decoder for deriving a memory storage address from said encoded memory storage address, said control module further in communication with said memory for retrieving an audio file corresponding to said memory storage address.

2. An audio storage and retrieval system as in claim 1 wherein said optically reflective region is substantially reflective to infrared radiation, and wherein said optically non-reflective region is substantially non-reflective to infrared radiation.

3. An audio storage and retrieval system as in claim 1 wherein said label further comprises an archive tab covering a substrate region on said label, said archive tab having either an optically reflective surface or an optically non-reflective surface, said substrate region having either an optically non-reflective surface or an optically reflective surface, such that said archive tab can be removed to expose said substrate region.

4. An audio storage and retrieval system as in claim 1 wherein said encoded memory storage address comprises a geometric pattern formed on said label surface from said at least one optically reflective region and said at least one optically non-reflective region.

5. An audio storage and retrieval system as in claim 1 wherein said memory comprises a plurality of addressable cells.

6. An audio storage and retrieval system as in claim 1 wherein said memory is removable from said audio storage and retrieval device.

7. An audio storage and retrieval system as in claim 1 wherein said decoder comprises a recess feature to physically accommodate said label so as to reduce ambient optical radiation incident on said label when said decoder is reading said encoded memory storage address.

8. A sound retrieval apparatus suitable for retrieving from a memory an audio file having a memory storage address, said apparatus comprising:
- a decoder for reading an encoded memory storage address from a label, said encoded memory storage address obtained by encoding the audio file memory storage address, said decoder including a plurality of optical sources and a plurality of optical detectors, said encoded memory storage address further having a geometric pattern formed on a surface of said label, said geometric pattern including at least one optically reflective region and at least one optically non-reflective region, said decoder further including lateral optical barriers disposed between adjacent pairs of said optical sources and said optical detectors so as to prevent optical radiation emitted from a said optical source in one said pair from reaching a said optical sensor in an adjacent said pair; and
- a control module in communication with said decoder for deriving the audio file memory storage address from said encoded memory storage address, said control module further in communication with the memory for retrieving the audio file corresponding to the memory storage address.

9. A sound retrieval apparatus as in claim 8 further comprising:
- a microphone for obtaining audio information;
- means for storing said audio information in the memory as said audio file; and
- a loudspeaker for playing back said retrieved audio file.

* * * * *